United States Patent
Asseline et al.

(10) Patent No.: US 6,676,084 B2
(45) Date of Patent: Jan. 13, 2004

(54) SMALL-SIZED RADIO-CONTROLLED FLYING DEVICE

(75) Inventors: Jean Asseline, Clapiers (FR); George De Noni, Clapiers (FR)

(73) Assignee: Institut de Recherche pour le Developpement, Paris (FR)

( * ) Notice: Subject to any disclaimer, the term of this patent is extended or adjusted under 35 U.S.C. 154(b) by 0 days.

(21) Appl. No.: 10/168,588

(22) PCT Filed: Dec. 20, 2000

(86) PCT No.: PCT/FR00/03618

§ 371 (c)(1),
(2), (4) Date: Jun. 24, 2002

(87) PCT Pub. No.: WO01/46009

PCT Pub. Date: Jun. 28, 2001

(65) Prior Publication Data

US 2002/0190157 A1 Dec. 19, 2002

(30) Foreign Application Priority Data

Dec. 22, 1999 (FR) ............................................ 99 16260

(51) Int. Cl.[7] .............................................. B64D 17/34
(52) U.S. Cl. ........................ 244/152; 244/902; 244/903
(58) Field of Search .......................... 244/13, 152, 145, 244/189, 190, 902, 903

(56) References Cited

U.S. PATENT DOCUMENTS

| | | |
|---|---|---|
| 4,601,443 A | 7/1986 | Jones et al. |
| 4,934,630 A | 6/1990 | Snyder |
| 5,160,100 A | 11/1992 | Snyder |
| 5,620,153 A | 4/1997 | Ginsberg |

FOREIGN PATENT DOCUMENTS

| | | | | |
|---|---|---|---|---|
| DE | 3046430 | * | 7/1982 | ........... B64C/25/06 |
| DE | 88 00 297.7 | | 5/1988 | |
| EP | 0278784 | * | 8/1988 | ........... B64C/31/02 |
| EP | 09315393 | | 12/1997 | |
| EP | 11059595 | | 3/1999 | |
| GB | 2189752 A | * | 11/1987 | ........... B64C/17/00 |
| JP | 43722497 | * | 12/1992 | ........... B64D/17/10 |

OTHER PUBLICATIONS

Mechanix Illustrated, Sep. 1978 "A New Kind of Flying Machine".*

XP–000912240, Unmanned Systems, Morris Messinger, "REMOTE", Summer 1994.

* cited by examiner

Primary Examiner—Charles T. Jordan
Assistant Examiner—Timothy D. Collins
(74) Attorney, Agent, or Firm—Young & Thompson (57) ABSTRACT

A small radio controlled flying device propelled by a thermal engine (20) with pusher type airscrew (19) for remote sensing, the device being capable of short take-off and landing and flying at maximum speed of 35 Km/h. The device includes a pod and wings, the pod (1) being a rigid tricycle carriage dismountable by disengagement of substantially pyramidal jig with rear base (2) and front apex (7), lower plane (3), two lateral planes (4, 5) and an upper plane (6). The base is a welded one-piece element that includes the engine, the airscrew, a tank and the radio control. The apex is a welded one-piece element. The lower plane and the two lateral planes include spars (11, 12) assembled at the base and as the apex. The lower plane includes at its three end angles two rear wheels (8) and a front wheel (9), the front wheel being provided to protrude towards the front in the apex and the wheels being low pressure tires. The wings (13) are a caisson-type supple parachute and are connected to the pod in an adjustable fashion by two front slings (17), two braking slings (18) acting on the two flaps/ailerons.

11 Claims, 6 Drawing Sheets

FIGURE 6

# SMALL-SIZED RADIO-CONTROLLED FLYING DEVICE

FIELD OF THE INVENTION

This invention relates to a small-sized radio controlled flying device intended to transport and to use air remote sensing equipment. It finds applications in the field of geology, agronomy, geography, pedology, hydrology or more generally the knowledge of the media and environment and the prevention of the risks of degradation for the environment.

BACKGROUND OF THE INVENTION

Remote sensing by satellite images in the visible band or in other bands has seen rapid growth. However, in spite of the considerable increase of the resolution, it is still necessary to have high resolution pictures of the sites that are analysed, either because the satellite image has supplied an index that one seeks to confirm, or to correlate the information from both these types of sources.

To this end, one uses flying means such as aircraft, helicopter, let alone airships circulating at altitudes lower than the satellites and transporting remote sensing equipment. However, these means exhibit a certain number of shortcomings. They have more especially a very high use cost, they must be implemented by specialised personnel and they are subject to the administrative restraints governing the circulation of the airplanes: flight authorisation, flight-over . . .

It is thus advisable to have air means with reduced use cost and which can be implemented by non or little specialised personnel. Il has thus been suggested to use remote controlled airplane, helicopter or airship scale models. If such scale models are now commercially available for a relatively small cost and the radio means are fully developed, nevertheless they are not particularly suited to transporting a load and more especially remote sensing equipment. In fact, these scale models are relatively fragile, exposed to important vibrations, to reduced autonomy and to a steering capacity involving consequent and specialised training.

However, small-sized radio controlled airships, moreover the low cost of their implementation, advantageously are free, or pratically free, with administrative constraints as regards their use. More especially, in France, the maximum flight altitude is limited to 150 m, which is sufficient for the aimed application and several radio frequencies for the remote control are available.

This invention suggests therefore using the advantages of aero modelling: low cost, minimum administrative use constraints, simplicity of implementation and safety for the operators by providing a device which enables to transport a charge of a few kilos, while ensuring proper safety of the on-board equipment and involving only a few hours training to acquire suitable steering abilities.

Thus, this invention relates to a small-sized radio controlled flying device propelled by a thermal engine with pusher type airscrew for the transport and use of remote sensing equipment, said device enabling short take-off and landing by taxiing and enabling to fly at maximum 35 Km/h.

SUMMARY OF THE INVENTION

According to the invention the device comprises a pod and wings:

the pod is a rigid tricycle carriage of substantially pyramidal jig with rear base and front apex, lower plane, two lateral planes and an upper plane, the base is a welded one-piece element and comprising the engine, the airscrew, a tank and the radio control, the apex is a welded one-piece element, the lower plane and both lateral planes comprising spars at least assembled to the base and to the apex, the lower plane comprising at its three end angles two rear wheels and a front wheel, the front wheel being provided to protrude forward into the apex and the wheels being low pressure tires, the pod is dismountable by disengagement to enable the transport of said device with reduced volume, since at the rear the base can be disconnected from the spars and at the front the spars can be disconnected from the apex and the wheels being dismountable;

the wings are a supple caisson-type parachute comprising a leading edge with scoop and rear edgings, said wings being connected to the pod by two front slings and two braking slings acting on the rear edgings.

In various embodiments of the invention, the following means used individually or according to all their technically possible combinations are implemented:

each of the lateral planes comprises an upper spar, said spar being bent substantially towards its front end and comprising a wings attachment by a front sling and at least one equipment attachment, the wings attachment being of sliding type to enable variation of the balance of the device in relation to the equipment transported;

at least the spars are made of ZICRAL®;

the assembly is provided by bolts and wing nuts;

the assembly is provided by bolts and wing nuts comprising a braking means NYLSTOP®;

the wings is connected to the pod by the two quick-release front slings;

the quick-release means is a snap hook;

the engine is a 2-stroke engine with cubic capacity ranging between 10 and 50 cm$^3$;

the airscrew is two-blade and has a diameter ranging between 30 and 50 cm;

the airscrew is provided in a protective casing;

the wings have a surface ranging between 2 and 6 m$^2$;

the device is characterised by the following approximate parameters:

5.5 kg maximum total mass density for 2.4 m$^2$ wings and 7 kg for 3.8 m$^2$ wings;

4.8 kg maximum empty mass density with full tank;

wheels with 150 mm diameter;

jig of the cell: height at the base 620 mm, width at the base 650 mm, base/apex distance 750 mm;

the engine is a 23 cm$^3$ 2-stroke engine with electronic ignition and manual start by cord launcher with membrane carburettor and valve admission through the casing;

the radio control comprises at least one gas throttle acting on the speed of the engine and two winch controls acting on both braking slings;

the equipment attachment is of the pendulum type for absorbing the front-rear and lateral movements;

the equipment attachment comprises a first front-rear supporting tube mobile to rotate around its axis at each of both its ends on a transversal support integral with the pod, the rotation of the first supporting tube being absorbed by a first hydraulic shock-absorber integral with a spar, at least one piece of equipment being suspended from a fork-mounted suspension tube and pendular on the first supporting tube, the pendulum formed by the suspension tube being moreover absorbed by a second hydraulic shock-absorber integral with the first supporting tube;

at least one transversal support is fastened to the upper spars;

at least one transversal support is fastened to the base;

both transversal supports are fastened to the upper spars;

at least two pieces of equipment are suspended by two suspension tubes and at least a hinged linking arm connects said two suspension tubes to the second shock-absorber in order to provide a modifiable flat trapezoid;

the trapezoid is a parallelogram;

the first supporting tube comprises mounting orifices provided on its length in order to select the mounting position of the fork of the suspension tube along said first supporting tube;

the linking arm comprises mounting orifices provided on its length in order to select the position of the hinge at the suspension tube along said linking arm;

three pieces of equipment are suspended from three suspension tubes;

the elements are selected among the photo cameras, camcorder, camera, optic transducers;

the transversal supports are fastened to the pod by means of silent blocks-type shock-absorbers;

a stop handle is fastened at the rear and at the top of the base of the pod.

BRIEF DESCRIPTION OF THE DRAWINGS

This invention will be understood better when reading the description of a first embodiment wherein:

FIG. 4 represents the wings and, of a second embodiment wherein:

DETAILED DESCRIPTION OF THE INVENTION

Figure 1:
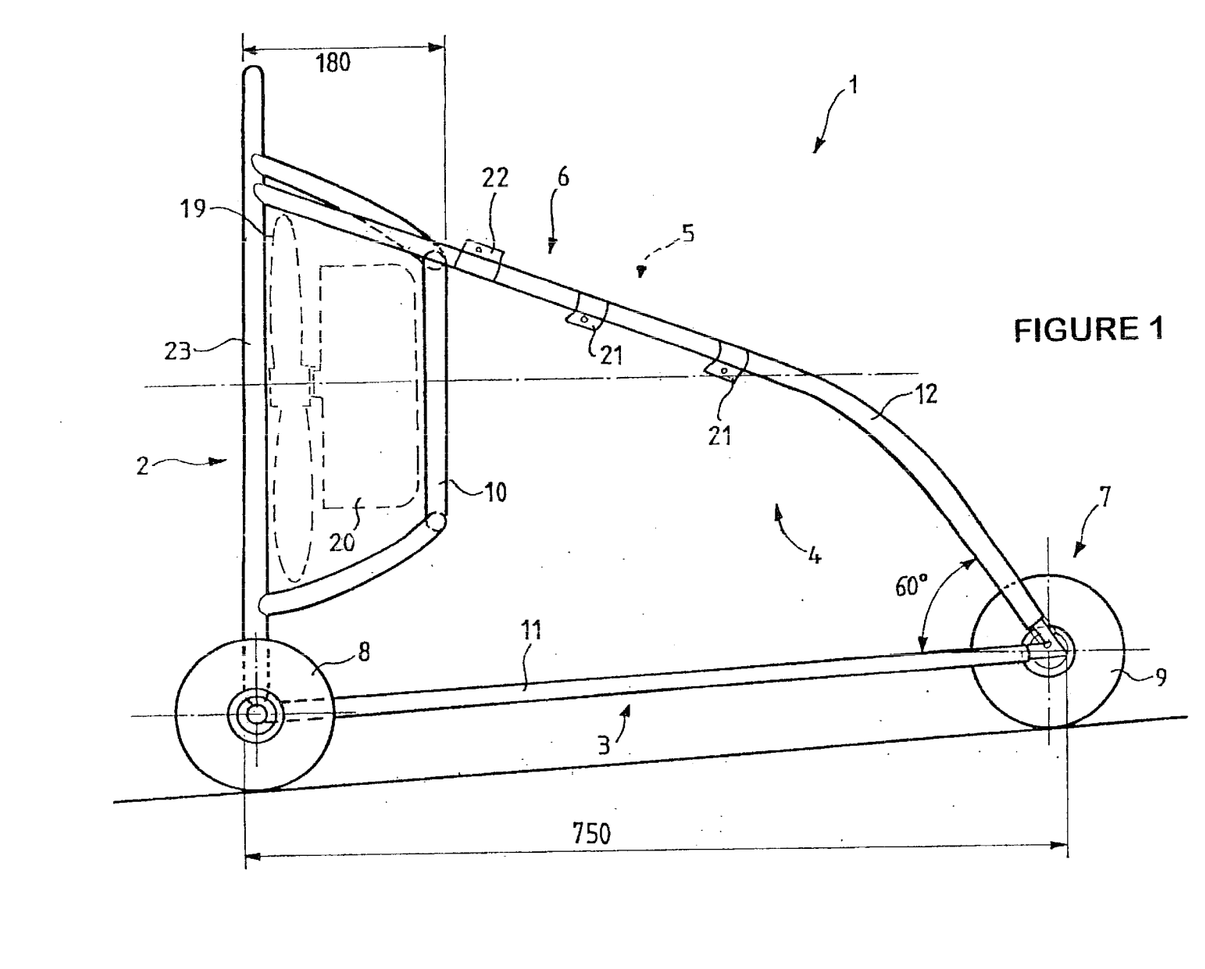
FIG. 1 represents a first pod seen laterally.

On FIG. 1, the pod 1 seen laterally enables to distinguish a base 2 to the rear and an apex 7 to the front. Between the base 2 and the apex 7 are provided spars delineating a general jig in the form of a pyramid at the rear and with an apex at the front. The pyramidal jig comprises a lower plane 3, an upper plane 6 and two lateral planes 4 and 5. The lower plane 3 is limited limited laterally by two lower spars 11, the upper plane 6 is limited laterally by two upper spars 12. The base 2 comprises an engine support 10, the engine assembly 20 and the airscrew 19 being represented in dotted lines. The engine support 10 is also used to maintain the accessory elements, tanks, radio electric equipment . . . Means for shock-absorbing the vibrations are provided: rubber blocks, foam . . . in order to protect the mechanic and electronic elements from the vibrations. These various elements are thus placed in a relatively protected zone since it is delineated between the base formed of a bow 23 and the engine support 10. The bow 23 also protects the users from the airscrew 19.

At the three apexes of the lower plane 3 are provided two rear wheels 8 and a front wheel 9. The front wheel 9 is in particular provided in the apex 7. The rear wheels are dismountable thanks to bolts. The front wheel 9 may also be dismountable but the apex being also dismountable, for easier transport of the device thus dismounted, the front wheel 9 can be left on the apex 7.

The upper spars 12 are cambered towards their front section and comprise each a wings attachment 22 which is sliding as well as two equipment attachments 21. The sliding wings attachment 22 is intended to receive one of the two slings of the wings by means of a quick-release hooking element, for instance a snap hook, enabling thus quick fastening or releasing of the wings on the pod. The sliding of the wings attachment 22 along of the two upper spars 12 enables to adjust the fastening point of the sling in relation to the distribution and to the weight of the equipment transported in order to adjust the balance of the pod 1. Once this position has been determined, the wings attachment 22 is held in place by any appropriate means and for instance by bolts and braked wing nuts. The pod 1 is dismountable, the assembly of the pod 1 being obtained by engaging the elements into one another and holding the latter by bolts and braked wing nuts. More especially, the upper spars 12 and the lower spars 11 can be disengaged from the apex 7 towards the front and from the base 2 towards the rear. The engagement/disengagement zone of the spars on the base may be directly located at the base or on a point situated along the spars at a distance from the base. This point will be preferably provided in the thickness defined by the planes of the base 2 and the engine support 10 so that the base, once dismounted, does not occupy greater thickness than that of the engine support 10. In another embodiment of the invention, it is aimed that dismounting can take place by folding the element with respect to one another.

Figure 2:
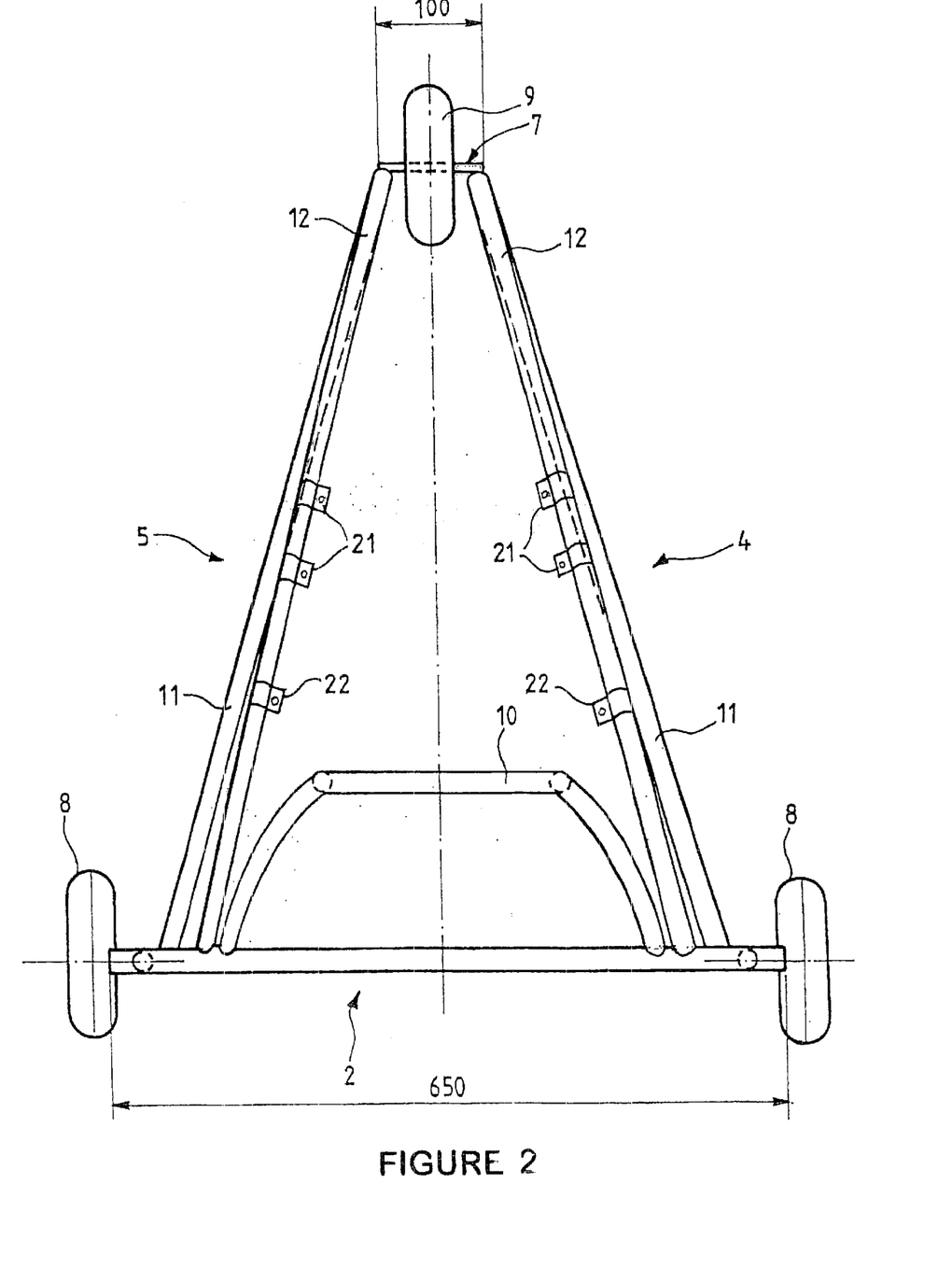
FIG. 2 represents the first pod seen from above.

On FIG. 2, the pod 1 seen from above exhibits a substantially symmetric structure. The front wheel 9 is provided symmetrically in the apex 7 and protrudes in order to ensure a shock-absorbing effect in case of sudden arrival.

Figure 3:
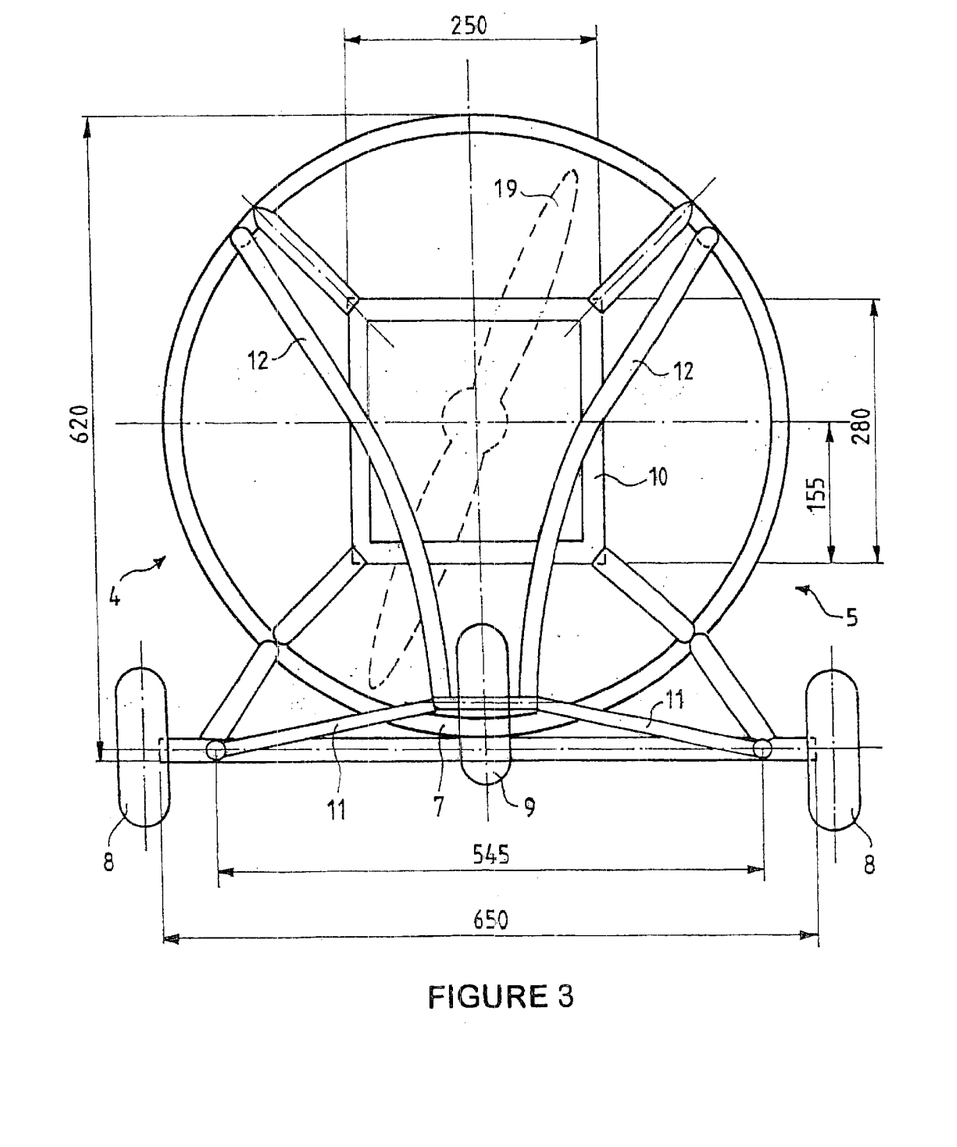
FIG. 3 represents the first pod seen from the front.

On FIG. 3, the pod 1 seen from the front exhibits a substantially symmetric structure.

Figure 4:
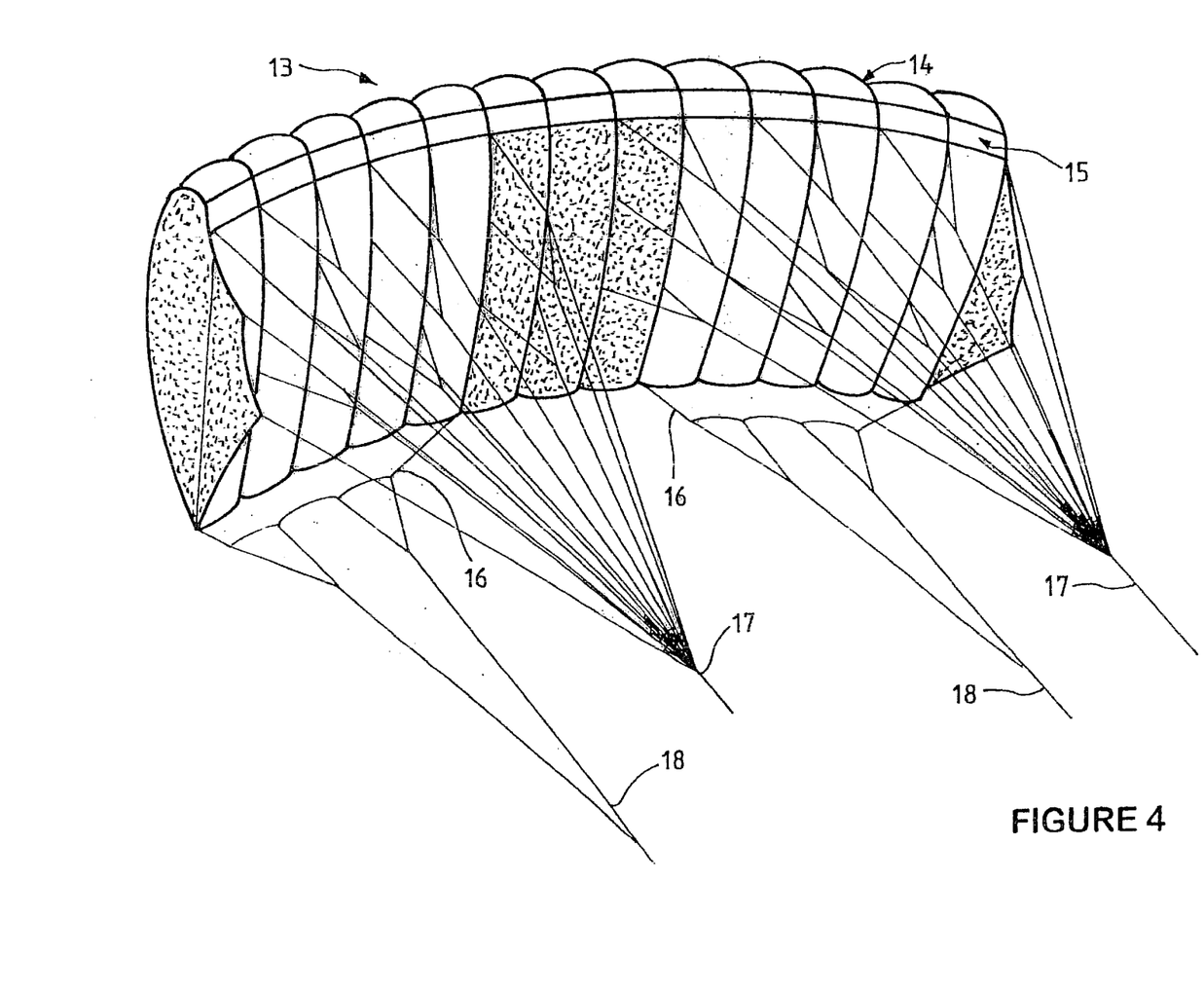

On FIG. 4, the wings 13 exhibit a leading edge 14 with a scoop 15, as well as flaps/ailerons 16, these flaps/ailerons play then the usual role of the rear edgings. The wings 13 are held by two front slings 17 and dynamic control is obtained by two braking slings 18 acting on the rear edgings or, if any, on the flaps/ailerons 16.

Figure 5:
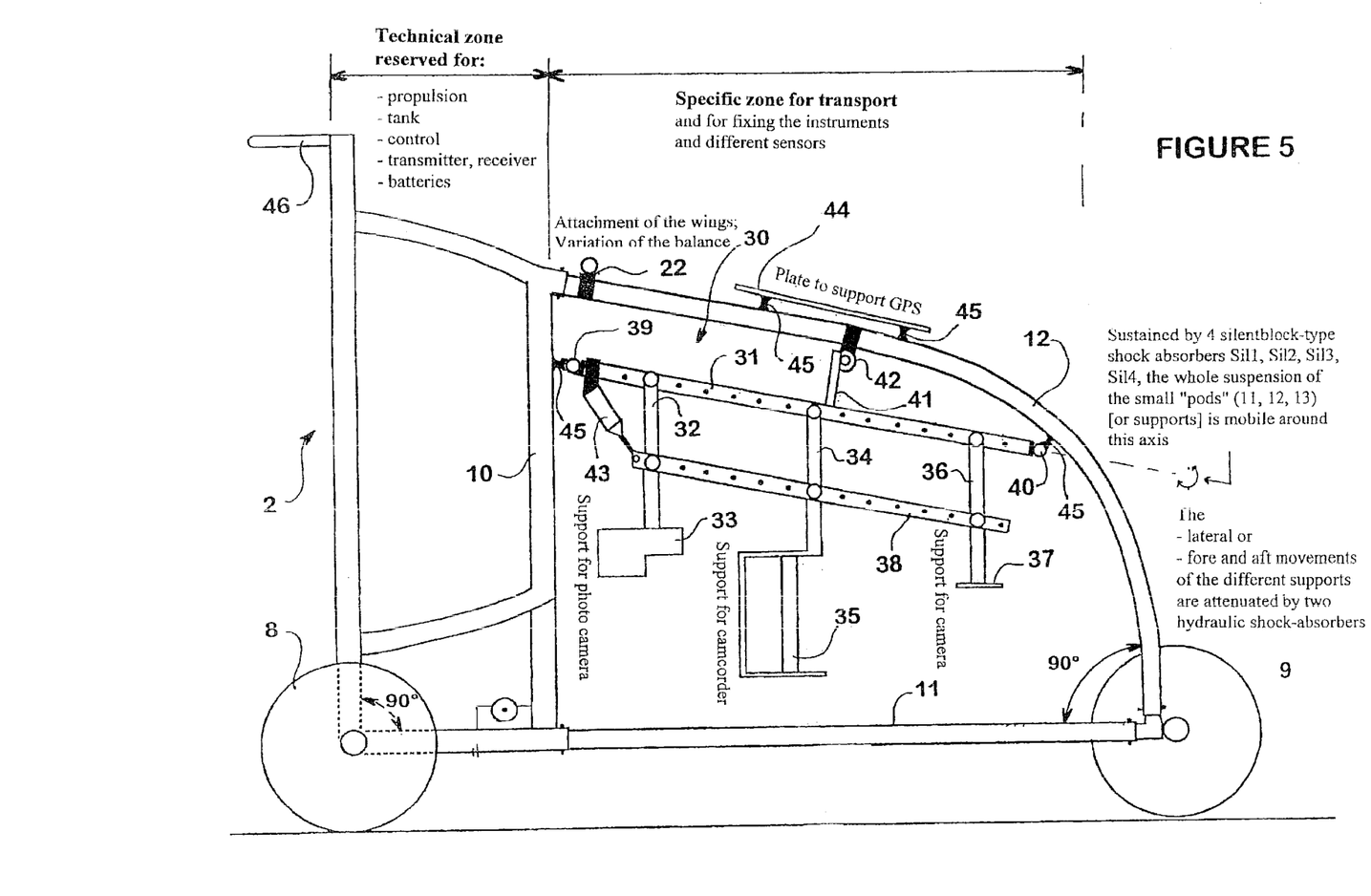
FIG. 5 represents a second pod seen laterally.
Figure 6:
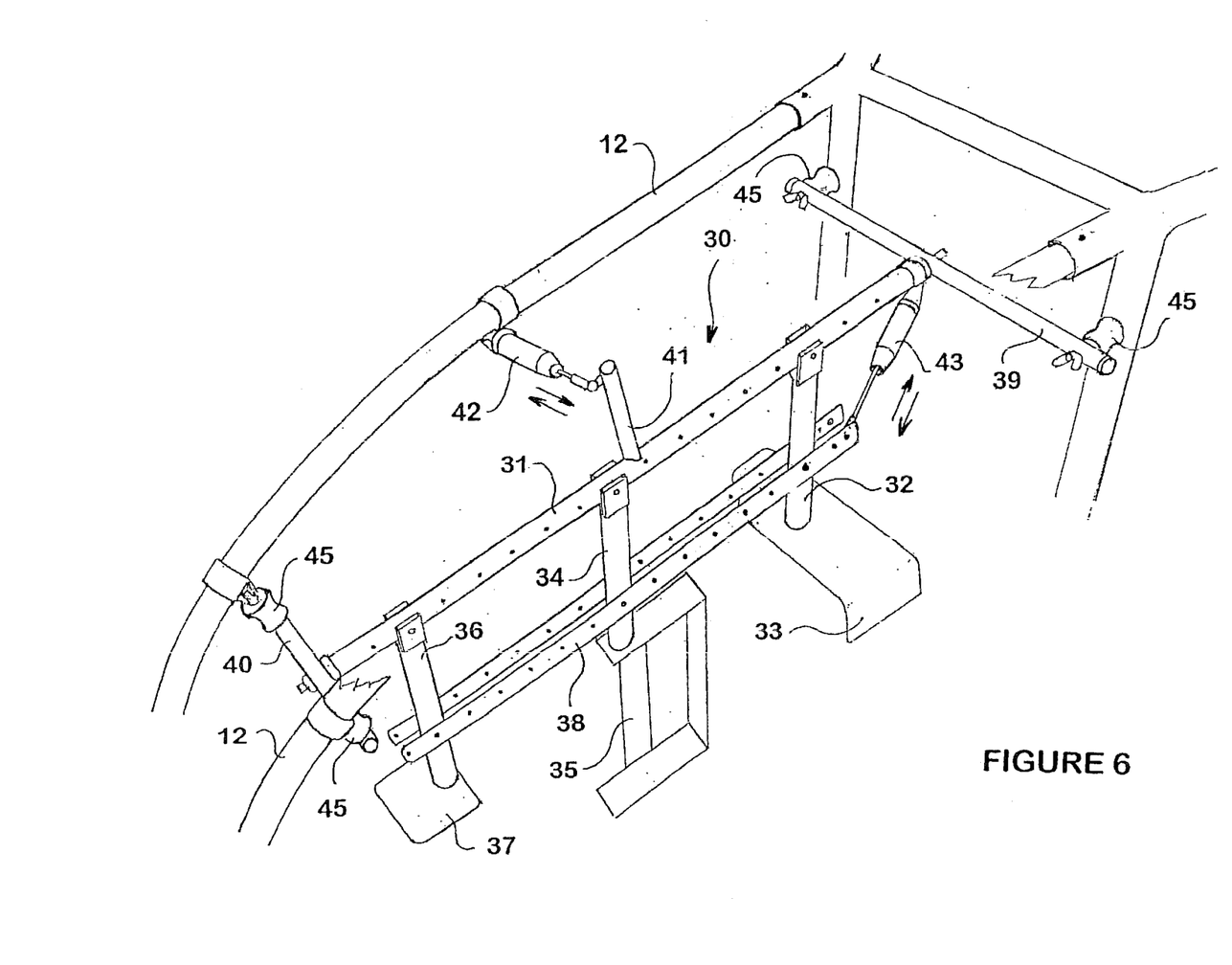
FIG. 6 represents the second pod as a perspective view.

Another example of embodiment of the invention represented on FIGS. 5 and 6 enables to have a greater transportable volume of equipment than in the first example thanks to greater cambering of the upper spars. The angle formed at the front between the origins of the upper and lower spars is in the first case, FIG. 1 of 60°, and in the second case, FIG. 5 of 90°. Similarly, the lower spars in the first case are right, FIG. 2, and in the second case, they are cambered in a horizontal plane in order to increase the surface delineated by both lower spars and through which the remote sensing is carried out. Besides, on FIG. 5, the assembly of the upper spars on the base of the pod is also modified in order to have a greater volume for motorisation, the radio electric equipment and other accessories. The servo-winches for actuating the braking slings are provided towards the lower section of the base of the pod. In order to facilitate the manipulations, a stop handle is fastened at the rear and at the top of the base of the pod.

FIG. 5 shows also the equipment attachment 30 which is of pendulum type with shock-absorption of the front-rear and lateral movements. The equipment attachment implements a first front-rear supporting tube 31 mounted mobile in rotation around its axis at each of both its ends on a transversal support 39, 40 fastened to the upper spars 12 and the base, the rotation of the first supporting tube being absorbed by a lever arm 41 and a first hydraulic shock-absorber 42 integral with a spar. The transversal supports are fastened to the pod by means of silent block-type shock-absorbers 45. Three pieces of equipment, a photo camera, a camcorder, a camera are suspended from the supports 33, 35, 37, each by a suspension tube 32, 34, 36 fork-mounted and pendular on the first supporting tube 31. In practice, between 1 and 5 pieces of equipment can be boarded. A means for removable attachment of the suspension tube or the element on the suspension tube is implemented in order to allow the transport or not of the element in relation to the flight mission. As the elements which can be transported or not and therefore the charge and the load distribution of the flying device can be modified, the wings attachment via the front slings involves sliding attachments 22 enabling adjustment of the balance. A plate 44 to support GPS positioning means is fastened to the pod by silent blocks. The pendulums formed by the suspension tubes 32, 34, 36 are absorbed by a second hydraulic shock-absorber 43 integral with the first supporting tube 31, a hinged linking arm 38, a double arm, or an arm made of two profiles or punched plates connects the suspension tubes to the second shock-absorber in order to provide modifiable flat trapezoids such as parallelograms. The first supporting tube and the linking arm comprise mounting orifices provided on their lengths in order to select the mounting position of the fork of the suspension tube along said first supporting tube and the position of the hinge to the suspension tube along said linking arm.

FIG. 6 shows the equipment attachment and, more especially, the linking arm 38 which is formed of two hinged bars with rectangular section on either side of the suspension tubes. In certain of its versions, the device has enabled flights for a maximum total mass density of 12 kg for 3.8 m$^2$ wings and a maximum empty mass density of 8 kg at full tank. The maximum weight limit corresponds to a national regulation.

Differences between both examples of devices which have been described, are as regards the front:
the upper spars are elongated and exhibit a stronger cambering in order to increase the useful height inside the structure;
the angle formed close to the front wheel between the upper and lower spars goes from 60° to 90°;
the angle formed close to the rear wheels between the lower spars and the airscrew casing is a right angle;
the lower spars which were rectilinear are oblong and exhibit a cambering (on the horizontal plane) in order to release enlarged space in the lower plane of the structure and thus to open up the possible shooting angle of the different devices and transducers.

As regards the rear section:
two spacers reinforce the structure,
the attachment points of the servo-winches are lowered down to the base of the structure (level of the lower spars) in order to increase the useful traction clearance on the braking slings of the wings,
a stop handle is added on the upper section of the bow in order to move the airscrew away from the soil when the aircraft is on its "base" (nose up).

The set of suspension and holding elements of the on-board devices or transducers enables:
to insulate them from the vibrations caused by the engine,
to ensure their positioning and hooking,
to interlock them in their movements, so that the sights of each transducer are identical,
to hold them in vertical sighting position under the device by simple gravity effect,
to absorb the movements generated by the air turbulences on the aircraft.

The suspension and holding elements of the on-board devices and transducers on the aircraft are thus composed of:
two transversal tubes in ZICRAL, connected to the structure of the aircraft each by two silent blocks at their ends, they are held by wing nuts, the two tubes are punched in the centre to accommodate a spindle,
a central tube in ZICRAL, punched every 25 mm on the same plane, with Teflon® sleeves at each end enabling to accommodate a spindle with NYLSTOP nuts,
the rotation of the tube is limited by the presence of a hydraulic shock-absorber. The latter is connected to the upper spar of the structure by a collar with screws and braking nuts and to the central tube by a small lever arm in ZICRAL and a joint. The characteristics of the shock-absorber determine the possible rotation angle of the central tube as well as the friction or resistance to the movement,
both linking parts are punched every 25 mm, they are placed on either side of the supports and hold them interlocked in their movements,
the stroke and the friction of the front and rear movements (with respect to the structure of the aircraft) are limited by a second hydraulic shock-absorber,
the hydraulic shock-absorber is connected to the linking part by a joint and to the central tube by a collar and screw+nut NYLSTOP.
each individual support is traversed by two screws+nuts NYLSTOP serving as axes, they are slightly tightened, but without any clearances in order to allow the movements of the pods; by gravity effect their weights associated to that of the devices and cameras will have a tendency to bring them back constantly to vertical sighting position.

The device exhibits optimum safety as regards the on-board equipment, as the parachute-type wings slow the descent down considerably in case when the propulsion means should fail and/or in case when the remote control should become non-operational. Besides, the arrangement of the wheels at the three angles of the lower plane as well as the general pyramidal shape encompassing the engine and others as well as the remote sensing equipment ensure protection in case of impact.

What is claimed is:
1. A small-sized radio controlled flying device propelled by a thermal engine (20) with pusher type airscrew (19) for the transport and use of remote sensing equipment, said device comprising a pod and wings enabling short take-off and landing by taxiing and enabling to fly at maximum speed of 35 Km/h, the wings (13) being a caisson-type supple parachute comprising a leading edge (14) with scoop (15) and rear edgings, said wings being connected to the pod by two front slings (17), two braking slings (18) acting on the rear edgings, characterised in that the pod (1) is a rigid tricycle carriage of substantially pyramidal jig with rear base (2) and front apex (7), lower plane (3), two lateral planes (4, 5) and an upper plane (6), the base being a welded one-piece element and comprising the engine, the airscrew, a tank and the remote control, the apex being a welded one-piece element, the lower plane and the two lateral planes comprising spars (11, 12) at least assembled at the base and at the apex, the lower plane comprising at its three end angles two rear wheels (8) and a front wheel (9), the front wheel being provided to protrude towards the front in the apex and the wheels being low pressure tires, the pod being dismountable by disengagement to enable the transport of said device under a reduced volume, whereas at the rear the base can be disconnected from the spars and at the front the spars can be disconnected from the apex and the wheels being dismountable, and in that each of the lateral planes comprises an upper spar, said spar being cambered substantially towards its front end and comprising a wings attachment (22) by front sling and at least one equipment attachment (30), the wings attachment being sliding to enable the variation of the balance of the flying device in relation to the equipment transported.

2. A flying device according to claim 1, characterised in that at least the spars are made of an alloy.

3. A flying device according to claim 1, characterised in that the assembly is provided by bolts and wing nuts comprising a braking means.

4. A flying device according to claim 1, characterised in that the wings are connected to the pod by both quick-release front slings.

5. A flying device according to claim 1, characterised in that the engine is a 2-stroke engine with a cubic capacity ranging between 10 and 50 $cm^3$.

6. A flying device according to claim 1, characterised in that the airscrew is two-blade and has a diameter ranging between 30 and 50 cm.

7. A flying device according to claim 1, characterised in that the airscrew is provided in a protection casing.

8. A flying device according to claim 1, characterised in that the wings have a surface ranging between 2 and 6 $m^2$.

9. A flying device according to claim 1, characterised by the following approximate parameters:
- 5.5 kg maximum total mass density for 2.4 $m^2$ wings and 7 kg for 3.8 wings;
- 4.8 kg maximum empty mass density with full tank; wheels with 150 mm diameter;
- jig of the cell: height at the base 620 mm, width at the base 650 mm, base/apex distance 750 mmi;
- the engine is a 2-stroke engine with cubic capacity of 23 $cm^2$ with electronic ignition and manual start by cord launcher with membrane carburetor and valve admission through the casing.

10. A flying device according to claim 1, characterised in that the radio control comprises at least a gas throttle acting on the speed of the engine and two winch controls acting on the two braking slings.

11. A flying device according to claim 1, characterised in that the equipment attachment (30) is pendulum type with shock-absorption of the front-rear and lateral movements, the equipment attachment comprising a first supporting front-rear tube (31) mounted mobile in rotation around its axis at each of both its ends on a transversal support (39, 40) integral with the pod, the rotation of the first supporting tube being absorbed by a first hydraulic shock-absorber (42) integral with a spar, at least one piece of equipment being suspended from a suspension tube (32, 34, 36) fork-mounted and pendular on the first supporting tube, the pendulum formed by the suspension tube being moreover absorbed by a second hydraulic shock-absorber (43) integral with the first supporting tube.

\* \* \* \* \*